Dec. 15, 1931.                W. HEFTI                1,836,798
         LINER FOR THE CYLINDERS OF RECIPROCATING ENGINES
                       Filed July 15, 1930

INVENTOR:
Wilhelm Hefti
BY
ATTORNEY

Patented Dec. 15, 1931

1,836,798

UNITED STATES PATENT OFFICE

WILHELM HEFTI, OF WINTERTHUR, SWITZERLAND, ASSIGNOR TO THE FIRM OF SULZER FRERES SOCIETE ANONYME, OF WINTERTHUR, SWITZERLAND

LINER FOR THE CYLINDERS OF RECIPROCATING ENGINES

Application filed July 15, 1930, Serial No. 468,055, and in Switzerland August 13, 1929.

This invention relates to liners for the cylinders of reciprocating engines and in particular to divided liners for the cylinders of double-acting internal combustion engines.

Various proposals have been made in the case of divided liners to ensure a satisfactory joint between the individual parts of the liner. Where the liners comprise two or more superimposed cylindrical sections, the abutting end surfaces of the sections have been provided with some form of aligning device—such as a projecting tongue or flange—on one section engaging a correspondingly shaped groove on the other adjacent section resulting in a joint on the inner wall of the liner which lies in one plane at right angles to the axis of the cylinder. Such a joint produced considerable wear upon the piston rings and this was increased if the two sections were inaccurately centered or aligned. Proposals have also been made to give the abutting ends of the liner sections a sinuous or wave-like form but in such cases as there was no means for maintaining the two sections in alignment the slightest play between the liner and the cylinder produced a series of rough surfaces which caused rapid wear of the piston rings and led to risk of breakage.

The object of the present invention is to provide a joint which will obviate the drawbacks of the previous constructions whilst combining their respective advantages.

To this end, according to the present invention, the adjoining ends of the liner sections are stepped or flanged, the abutting edges of the inner flanges being of irregular or wave-like form whilst the abutting edges of the surrounding outer flanges are shaped to produce a true butt joint in a plane at right angles to the cylinder axis, which supports the two sections and maintains them in proper alignment.

Two constructions of liner according to this invention are diagrammatically illustrated in vertical section in the accompanying drawings from which all non-essential constructional details have been omitted.

Figure 1:
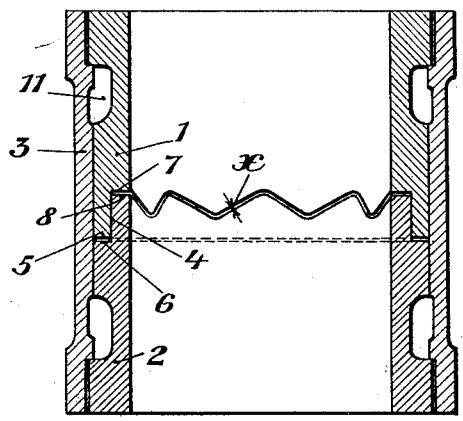

In the construction shown in Figure 1 the sections 1 and 2 of the liner are enclosed by the outer casing 3 and their adjacent ends are stepped or flanged so as to form a half-lapped joint at 4. The abutting ends 5 and 6 of the two sections form a butt joint which lies in one plane at right angles to the axis of the cylinder. The abutting or adjacent edges of the inner flanges 7 and 8 however are of wave-like form, so that the piston rings do not suddenly encounter a joint in the liner wall but gradually pass over this series of wave-like joints. Between the two sections of the liner a gap X may be provided so as to enable the liners to expand freely in an axial direction when they become heated.

Figure 2:
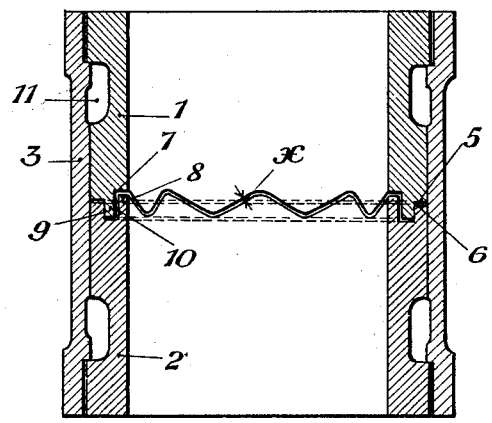

The construction shown in Figure 2 differs from that above described in that the adjoining ends of the liners are furnished with a tongue and grooved joint instead of with a half-lapped joint as in the previous construction. Hence the upper liner 1 is shown as furnished with a projecting tongue 9 to engage a groove in the lower liner 2.

In the particular construction illustrated cooling jackets are shown at 11 but it will be understood that any other arrangement may be provided without departing from this invention.

I claim:

1. A divided liner for a cylinder of a reciprocating engine particularly suitable for double-acting internal combustion engines, comprising sections stepped at adjoining ends to form a longitudinally expandible joint, abutting edges of irregular form at the inner flanges, and abutting edges at the surrounding outer flanges forming a true butt joint in a plane at right angles to the cylinder axis supporting said two sections and maintaining them in proper alignment.

2. A divided liner for a cylinder of a reciprocating engine particularly suitable for double-acting internal combustion engines, comprising sections stepped at adjoining ends to form an expandible joint, abutting edges of irregular wave-like form at the inner flanges, and abutting edges at the surrounding outer flanges forming a true butt joint in a plane at right angles to the cylinder axis and supporting said two sections and maintaining them in proper alignment.

In testimony whereof I have affixed my signature.

WILHELM HEFTI.